Nov. 29, 1966 W. E. ROSE 3,288,197
BRAKING DEVICE FOR ROTARY POSITIVE DISPLACEMENT GAS
METER IN A PILOT-LIGHTED GAS BURNING SYSTEM
Filed Sept. 7, 1965
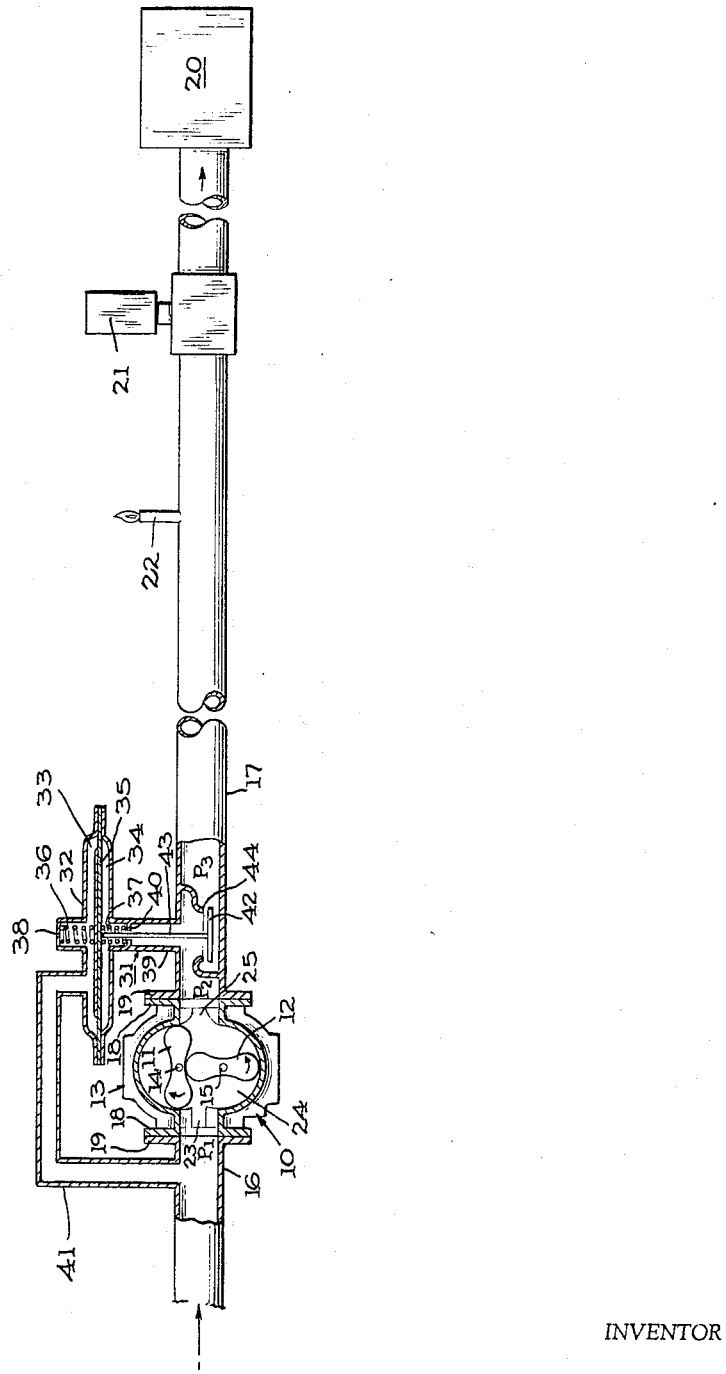
INVENTOR
WILLIS E. ROSE
BY
Cameron, Kerkam & Sutton
ATTORNEYS

United States Patent Office 3,288,197
Patented Nov. 29, 1966

3,288,197
BRAKING DEVICE FOR ROTARY POSITIVE DISPLACEMENT GAS METER IN A PILOT-LIGHTED GAS BURNING SYSTEM
Willis E. Rose, Connersville, Ind., assignor to Dresser Industries, Inc., Dallas, Tex., a corporation of Delaware
Filed Sept. 7, 1965, Ser. No. 485,174
6 Claims. (Cl. 158—115)

The present invention relates to fluid metering, and more particularly to a self-actuating braking device for meters of the rotary positive displacement type in pilot-lighted gas burning systems.

Gas meters of the type to which the invention is directed comprise a pair of lobed intermeshing rotors which are rotatably mounted in a casing and geared together so that gas passing through the casing causes rotation of the rotors and actuation thereby of a suitable register for measuring the volumetric flow of said gas. In a meter of this construction, the lobed rotors do not actually contact each other or the casing, but a small clearance is provided therebetween in order that a slight differential of pressure between the inlet and outlet sides of the meter may cause the rotors to turn.

When such a meter is used to measure the quantity of gas delivered to a pilot-lighted gas appliance burner having a quick-acting main appliance valve, an overrun problem arises resulting from the inertia of the rotors, which problem has several aspects. On opening of the quick-acting appliance valve, the rotors of the meter may not pick up speed quickly enough to supply sufficient gas to the downstream portion of the system to prevent starvation of the pilot light. On the other hand, when the quick-acting appliance valve closes upon cessation of the demand for gas, the rotors of the meter do not stop instantaneously, but continue to turn for several revolutions, thus overpressurizing the downstream portion of the system. This latter condition results first in a high flame at the pilot burner and then counter-rotation of the rotors which reduces the gas pressure in the downstream portion of the system below atmospheric pressure, thus extinguishing the pilot flame.

It is a primary object of the present invention to provide a gas metering system of the character described with a structurally simple device which overcomes the aforementioned disadvantages of prior systems, and effectively solves the overrun problem when rotary positive displacement meters are used to measure the flow of gas to pilot-lighted gas appliances.

Another object is to provide a gas meter of the lobed rotor type disposed in a gas supply conduit with a sensitive control valve to form a self-actuating fluid braking system for overcoming overrun problems resulting from the inertia of the meter rotors.

A further object of the invention is to provide an improved form of braking device for a gas meter embodying novel means for utilizing the ability of a lobed rotor type meter to absorb its rotational energy by pumping against a pressure during its deceleration period.

Another object is to provide an improved form of braking device for a gas meter embodying novel means for providing ballast to the pilot flame of a gas appliance after a quick-acting main appliance valve has opened and while the meter is accelerating.

In the embodiment herein illustrated and described by way of example, the invention is applied to a rotary positive displacement meter adapted to measure the quantity of gas supplied to a pilot-lighted appliance burner located downstream of the meter and having a quick-acting main appliance valve. A control valve is disposed in the gas feed supply line downstream of the meter, between the meter and the pilot burner, and is normally maintained in partially open position to permit gas to flow to the pilot. Upon opening of the quick-acting appliance valve, the control valve is opened further when the rotors of the meter are accelerating and the gas pressure at the inlet of the meter is greater than the pressure at the outlet. When the quick-acting appliance valve closes, the inertia of the meter continues to pump gas downstream of the meter; and when the downstream gas pressure becomes greater than the pressure at the inlet of the meter, the control valve closes, rapidly building up the pressure at the meter outlet and causing the rotors to decelerate. Such an arrangement prevents starvation of the pilot light by ensuring a sufficient supply of gas downstream of the meter upon opening of the quick-acting appliance valve, and also prevents a high flame on the pilot light and subsequent evacuation of the gas feed line downstream of the meter upon closing of the quick-acting appliance valve and subsequent counter-rotation of the meter rotors.

While the specification concludes with claims particularly pointing out and distinctly claiming the subject matter of the present invention, it will be more fully understood from the following description taken in conjunction with the accompanying drawing. However, it is to be expressly understood that the drawing is for the purpose of illustration only and is not intended to represent the full scope of the invention which is defined in the appended claims.

In the drawing, the single figure is a side elevational view, partly in cross section, of a gas meter installation embodying the invention having a diaphragm-operated control valve line-mounted downstream of the gas meter.

Referring now to the drawing, there is illustrated therein a rotary positive displacement gas meter 10 of well-known construction which comprises a pair of multi-lobed rotors or impellers 11 and 12 rotatably mounted within a chamber formed by the surrounding casing 13. The rotors 11 and 12 are mounted on parallel shafts 14 and 15, respectively, which are geared together so that the rotors rotate in opposite directions, as indicated by the arrows. The contour and finish of the rotors and the accuracy of cut of the gears is such that a small, substantially gas-tight operating clearance of a few thousandths of an inch is maintained between the rotors as they rotate. The surrounding casing 13 has semi-cylindrical side walls conforming to the paths described by the ends of the rotor lobes, and is otherwise so shaped that a small, substantially gas-tight operating clearance of a few thousandths of an inch is provided between the side and end walls of the casing and the rotors.

As shown, the meter 10 is mounted in communication with an inlet conduit 16 and an outlet conduit 17 forming parts of a conventional gas supply system, the meter casing 13 being provided with flanges 18 at its inlet and outlet sides for connection to coupling flanges 19 mounted on conduits 16 and 17. Inlet conduit 16 is connected to a suitable source of gas upstream of the meter 10, while outlet conduit 17 leads downstream to a gas appliance burner 20 having a conventional quick-acting main appliance valve 21 and a pilot burner 22. Gas entering the meter from conduit 16 passes through inlet passage 23 into metering chamber 24, rotates the rotors 11 and 12 in the directions indicated, and then flows through outlet passage 25 into conduit 17. The movement of the rotors is translated from one of shafts 14 and 15 to a counter index or register by any suitable means (not shown).

Since a rotary positive displacement meter of the character disclosed conventionally operates without valves, the full difference in pressure between the inlet 23 and the outlet 25 continuously loads the rotors 11 and 12. However, as previously mentioned, when the gas demand ceases, the rotors continue to turn due to inertia and produce a high flame at the pilot burner 22 and over-pressurization of the system downstream of the meter which, in turn, may cause counter-rotation of the rotors and evacuation of the conduit 17.

In accordance with the present invention, these objectionable results are avoided by providing a novel braking arrangement which includes a control valve 31 positioned in the downstream conduit 17 between the outlet 25 and the pilot burner 22.

The control valve 31 is operated by the differential pressure between the inlet 23 and outlet 25 of the meter 10, and various forms of differential valves may be utilized for achieving the aforementioned objectives of the invention. By way of illustration, there is shown a diaphragm-operated valve which provides a simple and efficient means for achieving meter braking in response to rapid closing of the main appliance valve 21 by isolating the pressure build-up downstream of the meter 10 and causing the meter to pump against this pressure build-up and absorb its rotational energy.

As shown in the drawing, the diaphragm-operated valve assembly 31 comprises a housing 32 having a pair of gas chambers 33 and 34 formed on opposite sides of a flexible diaphragm 35. A pair of opposed compression springs 36 and 37 are individually supported in the chambers 33 and 34 to compensate for the weight of diaphragm 35, the adjacent ends of the springs bearing against opposite sides of the diaphragm. The other end of spring 36 bears against an upward extension 38 on housing 32 which surrounds the spring along part of its length to conveniently limit lateral displacement, while the other end of spring 37 extends into a conduit 39 below the diaphragm 35 and seats on an annular abutment 40 provided in said conduit. Conduit 39 communicates at one end with chamber 34 and at its other end with conduit 17 downstream of the meter 10 so as to maintain the pressure in lower chamber 34 equal to the outlet pressure $P_2$ of the meter. The upper chamber 33 is in communication with conduit 16 upstream of the meter via a conduit 41 so as to maintain the pressure in chamber 33 equal to the inlet pressure $P_1$ of the meter.

The valve assembly 31 also includes a valve disc 42 which is supported for reciprocal vertical movement in conduit 17 by a stem 43 which extends upwardly through conduit 39 and is fixed at its upper end to diaphragm 35. Valve disc 42 is biased away from its horizontally disposed seat 44 in conduit 17 by compression springs 36 and 37 which normally maintain the valve in partially open position. With this construction, the valve disc 42 will move upwardly, as viewed in the drawing, to engage seat 44 and shut off the flow of gas through conduit 17 when the pressure $P_1$ at the inlet to the meter is less than the pressure $P_2$ at the outlet of the meter, thus limiting the build-up of pressure $P_3$ between the valve 31 and the pilot burner 22.

In operation, when the quick-acting main appliance valve 21 is initially opened and the rotors start to turn due to the flow of gas through the meter casing, the inertia of the rotors is such that they may not turn quickly enough to provide a full supply of gas to the system downstream of the meter, and a differential pressure occurs across the meter with pressure $P_1$ being greater than pressure $P_2$. This differential pressure overcomes the force of spring 37 and causes disc 42 to move further away from seat 44, downwardly as viewed in the drawing, so as to further open the valve 31. As a result, the volume of gas under the diaphragm 35 in chamber 34 is forced into the downstream side of conduit 17 through valve 31 and serves as a ballast to feed the pilot burner 22 and prevent starvation of the pilot flame. As the rotors come up to speed, the differential pressure across the meter diminishes and valve disc 42 is returned to its neutral or normal, partially open operating position.

When the demand for gas ceases upon closure of the main appliance valve 21, the rotors of the meter may continue to turn for several revolutions due to inertia, which causes the differential pressure across the meter to reverse, the outlet pressure $P_2$ becoming greater than the inlet pressure $P_1$. The increased pressure in chamber 34 then overcomes the force of spring 36, flexing diaphragm 35 upwardly, which causes the valve disc 42 to move in the corresponding direction to engage seat 44, thereby closing the valve and limiting the increase in pressure $P_3$ by isolating the pressure build-up at the outlet of the meter. The high pressure build-up between the outlet 25 of the meter and valve 31 during deceleration of the rotors serves to brake the rotors due to the energy-absorbing characteristic of the rotary meter. Any continued build-up of pressure $P_2$ results in valve disc 42 being seated tighter. Thus the brake is self-actuating and deceleration of the meter takes place rapidly.

It will be apparent from the foregoing description that the present invention provides a simple and efficient braking arrangement for a rotary positive displacement gas meter which effectively solves the overrun problem caused by inertia of the meter rotors upon opening and closing of a quick-acting appliance valve in a pilot-lighted gas burning system. Although only one specific embodiment of the invention has been described and illustrated herein, it will be obvious to those skilled in the art that the inventive concept is capable of a variety of mechanical modifications. It is therefore intended by the appended claims to cover all such modifications which fall within the true scope of the invention.

What is claimed is:

1. In a pilot-lighted gas burning system including a gas supply line adapted to be connected to a source of gas, a gas appliance burner and a pilot burner connected to said supply line, a quick-acting appliance valve in said supply line between said pilot burner and said appliance burner, and a rotary positive displacement gas meter in said supply line upstream of said pilot burner, said meter comprising a casing having an inlet and an outlet and a pair of lobed intermeshing rotors rotatably mounted in said casing and adapted to be rotated upon the passage of gas therethrough, the combination therewith of a self-actuating braking device for said meter comprising a control valve in said supply line between said meter and said pilot burner, means for normally maintaining said control valve in partially open position, and means responsive to the difference in pressure at the inlet and the outlet of said meter for so actuating said control valve that said valve is moved to closed position when closure of said appliance valve produces a pressure at the meter outlet greater than the pressure at the meter inlet and is moved to fully open position when opening of said appliance valve produces a pressure at the meter outlet less than the pressure at the meter inlet.

2. A system as set forth in claim 1 wherein said control valve includes a seat in said supply line and a valve disc normally biased away from said seat to maintain said valve in partially open position, said valve disc being movable by said actuating means in a first direction toward said seat to effect closing of said valve and in a second direction away from said seat to effect full opening of said valve.

3. A system as set forth in claim 2 wherein said control valve actuating means includes a housing having a diaphragm movably supported therein and connected to said valve disc to effect movement thereof in said first and second directions, said housing forming first and second chambers on opposite sides of said diaphragm, and means for applying the meter inlet and outlet pressures to said first and second chambers, respectively.

4. A system as set forth in claim 3 wherein said control valve actuating means further includes a pair of compression springs bearing against opposite sides of said diaphragm tending to maintain said control valve in partially open position.

5. In a pilot-lighted gas burning system including a gas supply line adapted to be connected to a source of gas, a gas appliance burner and a pilot burner connected to said supply line, a quick-acting appliance valve in said supply line between said pilot burner and said appliance burner, and a rotary positive displacement gas meter in said supply line upstream of said pilot burner, said meter comprising a casing having an inlet and an outlet and a pair of lobed intermeshing rotors rotatably mounted in said casing and adapted to be rotated by the passage of gas therethrough, the combination therewith of a self-actuating braking device for said meter comprising a control valve in said supply line between said meter and said pilot burner, means for normally maintaining said control valve in partially open position, and pressure responsive means for actuating said control valve, said pressure responsive means including a housing having first and second chambers in communication with the inlet and the outlet, respectively, of said meter, a diaphragm movably supported in said housing separating said chambers, and means responsive to movement of said diaphragm for closing said control valve to isolate said pilot burner from the outlet of said meter when the pressure at the meter outlet is greater than the pressure at the meter inlet, and to further open said control valve and supply ballast to said pilot burner when the pressure at the meter outlet is less than the pressure at the meter inlet.

6. A system as set forth in claim 5 wherein said control valve includes a valve disc connected to said diaphragm and a valve seat in said supply conduit, and said pressure responsive means includes a pair of compression springs bearing against opposite sides of said diaphragm tending to maintain said valve disc in a central position wherein said control valve is partially open.

References Cited by the Examiner
UNITED STATES PATENTS

| | | | |
|---|---|---|---|
| 1,676,444 | 7/1928 | Kitchen | 73—199 |
| 2,016,234 | 10/1935 | Hughes. | |
| 2,402,355 | 6/1946 | Whaley | 73—199 X |

JAMES W. WESTHAVER, *Primary Examiner.*